United States Patent Office 3,240,376
Patented Mar. 15, 1966

3,240,376
POLYGLYCIDYL ETHER OF A BISPHENOL AND TRIGLYCIDYL ETHER OF POLYOXYALKYLATED GLYCEROL IN TV TUBE FACE LAMINATE
John C. Smith and Wilbur E. Johnson, Lake Jackson, Tex., assignors to The Dow Chemical Company, Midland, Mich., a corporation of Delaware
No Drawing. Filed July 28, 1961, Ser. No. 127,467
6 Claims. (Cl. 220—2.1)

The invention is concerned with an improved epoxy resin which possesses a composite of desirable properties including clarity and flexibility heretofore not existing in epoxy resins.

Conventional epoxy resins which are principally based on the cured condensation product of an alkylidenediphenol and an epihalohydrin are hard and substantially non-elastic. Many specific processes and combinations of ingredients, e.g., those employing varying ratios and various reactants, such as polyamides and polysulfides, have been tried. Although some degree of success toward the desired goal of obtaining an elastomeric product having combined characteristics of softness and high elongation with satisfactory tensile strength has been achieved, a fully satisfactory elastomeric epoxy resin of high clarity has not been attained due to weaknesses or defects in one or more of the desired characteristics.

We have now discovered that when a mixture of polyepoxide ethers consisting of (1) a triepoxide ether and (2) a diepoxide ether, as hereinafter more fully described, is cured with an agent that effects crosslinking, there is produced a thermosetting elastomeric product which is soft, flexible, and transparent, and which has high elongation with satisfactory tensile strength.

A number of advantages are to be realized by the practice of the invention. The triepoxide ether, employed with the diepoxide ether in the practice of the invention, imparts a number of useful characteristics to the resin. It provides longer chain lengths between cross-linking sites and permits the effective utilization of a difunctional curing agent, e.g., a primary monoamine. Furthermore, becaues of the high activity of the triepoxide ether, the compositions employing it cure rapidly at a lower temperature than do known epoxy compositions. Because of the colorless nature of the resin of the invention and because colorless amine curing agents can be employed therewith, the compositions are exceedingly well suited for applications such as the laminating of glass plates and sheets through which images are transmitted for viewing purposes.

Although the terms "triepoxide" and "diepoxide" are used herein to represent polyepoxides containing about 3 and 2 oxirane groups, respectively, per molecule, it is understood that the terms include polyepoxides containing somewhat less than an average of 3 and 2 oxirane groups, respectively. For example, a polyepoxide containing only an average of from about 2.5 to 3 oxirane groups per molecule is included herein as a triepoxide, and a polyepoxide containing from about 1.6 to 2 oxirane groups is included herein as a diepoxide in the interests of simplifying the terminology.

The triepoxide required in the practice of the invention may be considered as falling within the generic Formula A set out below:

(A)

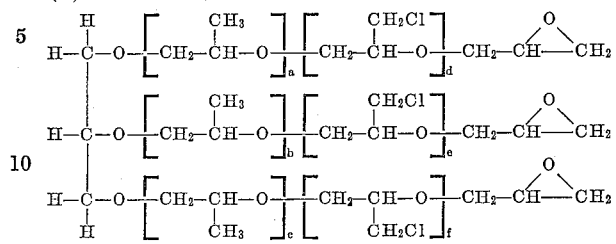

wherein $a$, $b$, and $c$ are independent values, the average sum of $a+b+c$ being from 0 to about 10 and wherein $d$, $e$, $f$ are independent values, the average sum of $d+e+f$ being from 0 to about 5, but, nearly always less than 2 and more often less than 1. The epoxide equivalent weight may vary from that of the triglycidyl ether of glycerol, more correctly called 1,2,3-tris(2,3-epoxypropoxy)propane, which is 260/3 or about 87, to an epoxide equivalent weight of about 1000.

Any hydrocarbon triol can be used to prepare the triepoxide ether used in the practice of the invention, e.g., glycerol, glycerol-oxyalkylene adducts, phloroglucinol, trimethylolethane and trimethylolpropane. Glycerol and the adducts of glycerol-propylene oxide and glycerolethylene oxide are most commonly employed. When glycerol is employed, the value of $a+b+c$ in the formula above is zero. The triepoxide ether most commonly employed is the glycerol-propylene oxide adduct wherein the average sum of $a+b+c$ is about 3 and the average sum of $d+e+f$ is not over 3 and preferably less than 1. The length of the polyoxyalkylene chain present in the glyceroloxyalkylene adducts may be controlled, largely by the molar ratio of the alkylene oxide to glycerol employed in the preparation thereof. The end use to which the resin is to be put is taken into consideration in the selection of polyepoxide ethers which are employed. The longer polyoxyalkylene chains are employed where an especially flexible cured resin is desired.

The triepoxide ether may be prepared by reacting a triol, e.g., glycerol or 1,2,3-tris(2-hydroxypropoxy)propane with an epihalohydrin, usually epichlorohydrin, in the presence of a Lewis acid catalyst, e.g., BF$_3$. The resulting product, substantially a tris-(chlorohydrin) is then converted to the triepoxide ether by dehydrochlorination with a base such as sodium hydroxide, and recovering the triepoxide ether so made.

The diepoxide ether which may be employed in the practice of the invention is the diepoxide of a dihydric alcohol or dihydric phenol, having a generic formula selected from either or both of the Formulae (a) and (b) set out below:

(a)

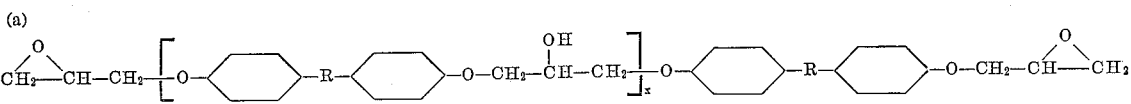

Wherein R is an alkane residue containing from 1 to 4 carbon atoms and $x$ has a value of from 0 to about 10 and usually has a value which results in an epoxide equivalent weight of between about 174 and about 2,000, and (b)

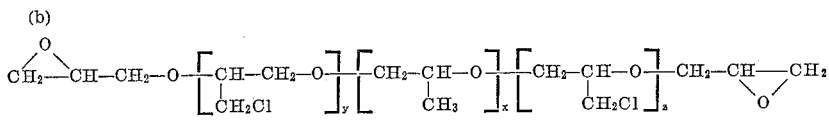

Where each of $y$ and $z$ is 0 or 1 and $x$ is of such value as to result in an epoxide equivalent weight of between about 84 and about 700.

Diepoxide ethers, which are illustrative of Formula (a) where $x$ is 0, are the following liquid or liqueflable resins made by reacting epichlorohydrin and bisphenol A: one with an epoxide equivalent weight of between 174 and 179 referred to for convenience hereinafter as D.E.R. 332; and one with an epoxide equivalent weight of between 187 and 193, similarly designated herein as D.E.R. 331. Illustrative of Formula (a) where $x$ has a value of 1 or more are: one which has an epoxide equivalent weight of between 475 and 575 called herein D.E.R. 661; one which has an epoxide equivalent weight of between 875 and 975 similarly called D.E.R. 664; and one which has an epoxide equivalent weight of between 1,600 and 2,000 called herein D.E.R. 667. Bisphenol A is the common name for 4,4'-isopropylidenediphenol and, therefore, in the resins listed above, R of Formula (a) is the alkane residue

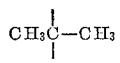

Diepoxide ethers which are illustrative of those of Formula (b) are the diglycidyl ethers of polyoxyalkylene glycols, e.g., the diglycidyl ether formed by reacting polyoxypropylene glycol of selected molecular weight with epichlorohydrin in the presence of a suitable catalyst and subsequently dehydrochlorinating with accompanying oxirane ring closure. The value of $y$ and $z$, as above, is dependent upon the ratio of epichlorohydrin to polyglycol which is used as described above. The average value of $y$ and $z$ is usually less than 1

The invention may be practiced by employing a triepoxide ether of Formula A as above described and one or more of the following diepoxide ethers: that represented by Formula (a) above when $x$ is 0, that represented by Formula (a) above when $x$ is 1 or more, that represented by Formula (b) above when $y$ and $z$ are substantially zero and $x$ is between about 1 and 10, and that represented by Formula (b) above when $y$ plus $z$ has a value greater than 1 and $x$ is between 1 and 10.

The proportion of the triepoxide ether and of the diepoxide ether employed in the practice of the invention is between about 2 and 50 percent of the triepoxide ether and between 50 and 98 percent of the diepoxide ether, in parts by weight based on the total weight of the polyepoxide ether mixture prior to the addition of the curing agent. When the percent of the triepoxide ether is less than 2, the final resin product tends to have some thermoplastic properties. When the percent of the triepoxide ether is greater than 50, the final resin product tends to show loss of strength. The preferred amounts to employ are between 5 and 25 parts by weight of the triepoxide ether and the balance, to make a total of 100 parts by weight, of the diepoxide ether.

The preferred embodiment of the invention employs at least two diepoxide ethers, one an aliphatic diepoxide ether preferably of a polyoxyalkylene glycol of a molecular weight of between about 250 and 1,200, up to about 75 percent by weight, and another an aromatic diepoxide ether, up to about 60 percent by weight, of the polyepoxide mixture. Best results are usually obtained when the aromatic diepoxide ether consists of both a relatively low molecular weight, e.g., D.E.R. 332, up to about 40 percent, and a relatively high molecular weight, e.g., D.E.R. 667, up to about 35 percent, by weight of the polyepoxide ether mixture.

The invention is carried out by admixing the triepoxide ether of a trifunctional alcohol, usually the triglycidyl ether of glycerol or of a glycerol-polyalkylene oxide adduct, with one or more of the diepoxide ethers above described within the weight ratio of the triepoxide ether to diepoxide ether or ethers set out hereinabove, in a suitable reaction vessel provided with stirring and heat-control means.

A curing agent, commonly of the amine type, is then admixed therewith, usually in an amount sufficient to provide about the stoichiometric quantity required to react with the oxirane groups present. The ensuing reaction is exothermic. The temperature due thereto is usually allowed to rise freely to about 100° C. Temperatures in this range are desirable to accelerate the cure. The initial curing temperature employed may be from room temperature to somewhat in excess of 100° C. Below room temperature the cure is undesirably slow and appreciably above 100° C. there is danger of charring the product. As in the case of prior epoxy resin systems, the curing temperature and time consumed for a satisfactory cure are dependent largely upon the selection and relative amounts of polyepoxides and curing agent employed. The gel time is taken as an indication of the rate of cure. The time for the composition of the invention containing the curing agent to gel is usually between 2 and 15 minutes. The complete cure of the composition necessarily requires an additional time following the gel.

Mono-primary and di-secondary amines are the preferred curing agents to employ. Among such amines are the mono-alkanol amines, illustrative of which are ethanolamine and isopropanolamine. Monoalkanol amines may be said to have the generic formula: $HO-R-NH_2$ where R is an alkylene group containing between 2 and 6 carbon atoms. A mixture of both primary and secondary amines may be employed if desired. Such polyfunctional amines as diethylenetriamine may also be employed either singly, or with a primary or secondary amine or a mixture thereof. The amines are usually employed in an amount sufficient to provide between 0.9 and 1.1 reactive hydrogen atoms per oxirane group, the preferable range being between 0.9 and 1.0 reactive hydrogen atoms per oxirane group. Other curing agents, e.g., dicarboxylic acids and anhydrides thereof, and Lewis acids and amine and ether complexes of Lewis acids may be employed.

The resin when cured is thermosetting, durable, highly resistant to chemical attack and to weathering, is soft and flexible, and possesses unusually high clarity. It has a tensile strength of between about 50 and 400 p.s.i., an elongation in the range of between about 50 and 500 percent, and a Shore A hardness in the range of between about 15 and 20.

The composition containing the amine curing agent may be cast, rolled, or spread, or otherwise applied to a solid surface, e.g., one of glass, wood, resin, fabric, hard rubber, or the like. It is especially useful for laminations because of its unusually highly tenacious character combined with elastomeric properties. A particularly useful application is in the preparation of resin-laminated glass articles such as are used for protective face plates of cathode ray envelopes, commonly referred to as tubes, a common example of which is the television picture tube. Such protective face plates are employed in laminar structures of this nature to guard against injury and damage resulting from a sudden fracturing of the tube, due, e.g., to the collapse of the highly evacuated tube, often referred to as an implosion. The highly tenacious and flexible character of the resin substantially prevents any shattering of bits of glass accompanying or resulting from the implosion.

The following examples are illustrative of the practice of the invention:

EXAMPLE 1

A composition was prepared by admixing: 15 parts of a diepoxide ether of polyoxypropylene glycol and epichlorohydrin having an epoxide equivalent weight of about 330, 15 parts of a diepoxide ether D.E.R. 332, and 15 parts of a triepoxide ether of a glycerol-polypropylene oxide adduct having an epoxy equivalent weight of about 215, in a suitable reaction vessel and heated to about 73° C., accompanied by moderate stirring. Thereafter 6.3 parts of monoethanolamine were admixed therewith.

Upon standing, the resulting composition gelled in 3 minutes, reaching a maximum temperature of 200° C. After curing overnight at room temperature the resulting thermoset resin was examined and found to be clear and flexible and to have the following physical properties according to standard tests:

| | |
|---|---|
| Tensile strength _____ p.s.i. | 237 |
| Elongation _____ percent | 193 |
| Shore A hardness _____ | 50 |

EXAMPLE 2

A second composition was prepared by admixing, in a reaction vessel of the type above-described, the following ingredients: 30 parts by weight of the diepoxide ether of polyoxypropylene glycol employed in the above example, 10 parts of the diepoxide ether D.E.R. 332, and 10 parts of the triepoxide ether employed in the above example. The resulting mixture was again heated to 73° C. and 6.1 parts of monoethanolamine admixed therewith. The admixture containing the curing agent was allowed to stand and gelled in 7.7 minutes. After curing overnight at room temperature the resin was examined. It was a flexible colorless elastomer having the following physical properties according to standard tests:

| | |
|---|---|
| Tensile strength _____ p.s.i. | 75 |
| Elongation _____ percent | 425 |
| Shore A hardness _____ | 23 |

EXAMPLE 3

A resin composition was prepared by admixing in a reaction vessel, of the type above described, the following ingredients: 30 parts by weight of the diepoxide ether of polyoxypropylene glycol defined in Example 1, 5 parts of the diepoxide D.E.R. 332, and 15 parts of the triepoxide ether of the type employed in the two examples above. The resulting mixture was heated to 83° C. and then 6.0 parts by weight of monoethanolamine were admixed therewith. The mixture containing the curing agent was allowed to stand and gelled in 5.5 minutes. After complete cure it was evaluated and was found to be clear and flexible and have the following physical properties according to standard tests:

| | |
|---|---|
| Tensile strength _____ p.s.i. | 69 |
| Elongation _____ percent | 175 |
| Shore A hardness _____ | 20 |

EXAMPLE 4

A composition consisting of: 20 parts of the diepoxide ether of polyoxypropylene glycol having the epoxide equivalent weight of that employed in the preceding examples, 10 parts of the diepoxide ether D.E.R. 332, and 15 parts of the triepoxide ether employed in the preceding examples were admixed in a reaction vessel of the type above described and heated to 72° C. At this temperature, 5.9 parts of monoethanolamine were admixed therewith. The resulting mixture was allowed to stand and gelled in 5.2 minutes. When fully cured, it was examined and found to be flexible, clear and transparent and to have the following physical properties according to standard tests:

| | |
|---|---|
| Tensile strength _____ p.s.i. | 121 |
| Elongation _____ percent | 172 |
| Shore A hardness _____ | 35 |

EXAMPLE 5

A resin composition was prepared by admixing in a suitable reaction vessel the following ingredients: 6 parts of the diepoxide ether of polyoxypropylene glycol having the epoxide equivalent weight of that employed in the preceding examples, 1 part of the diepoxide ether D.E.R. 331, and 3 parts of the triepoxide ether employed in the examples above. 1.23 parts of monoethanolamine, by weight of the mixture, was admixed therewith. The mixture thus made was cured at room temperature. The cured resin so made was transparent and flexible and found to have the following physical properties according to standard tests:

| | |
|---|---|
| Tensile strength _____ p.s.i. | 65 |
| Elongation _____ percent | 233 |
| Shore A hardness _____ | 20 |

EXAMPLE 6

A composition was prepared by admixing in a reaction vessel of the type above employed the following ingredients: 0.075 equivalent weight of the triepoxide ether of a glycerol-propylene oxide adduct having an epoxide equivalent weight of about 365 and 0.025 equivalent weight of the diepoxide ether D.E.R. 332. The mixture thus prepared was heated to 96° C. and then 0.1 equivalent weight of monoethanolamine was admixed therewith. An equivalent weight of one of the polyepoxides is the weight in pounds of the polyepoxide ether mixture necessary to provide 43 pounds of the oxirane group, i.e.

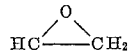

An equivalent weight of amine is the weight in pounds of the monoethanolamine necessary to provide one pound of reactive amine hydrogens. The gelation period required was 5 minutes. The resin obtained was transparent and of a highly elastomeric character.

EXAMPLE 7

The procedure followed in Example 6 was repeated except that the composition containing the curing agent was maintained at a curing temperature of 105° C. The composition cured at this temperature was examined and found to be of comparable flexibility and clarity to those prepared in the above examples.

EXAMPLES 8 to 14

The triepoxide ether and the diepoxide ether or ethers in the amounts set out, in percent by weight in the following table, were admixed in a reaction vessel of the type used in the above examples. The resulting mixtures were cured by admixing therewith the monoethanolamine or diethylenetriamine in the amounts stated, in parts by weight, shown in the table. The gel time required for each of the compositions containing the amine curing agent is also shown in the table.

The cured products made in Examples 8 to 14 were clear, transparent, flexible resins having good strength properties and high elongation.

The resin of the examples of the invention is especially adapted for use in laminating transparent glass or plastic sheets or plates. The combined properties possessed by the resin, particularly its high clarity and transmission of images without distortion, its high elasticity and strong bonding to glass and to hard plastic provide a laminating resin of economic significance especially for such uses as adhering protective shields on the viewing face of television picture tubes. To illustrate the suitability of the resin composition of the invention for use in making protective shields or panels on television tubes, the following examples were carried out.

Table

| Example No. | Diepoxide Ether [1] | Diepoxide Ether [2] | Triepoxide Ether [3] | Diepoxide Ether [4] | Monoethanolamine | Diethylenetriamine | Temp. in °C. | Gel Time in Minutes |
|---|---|---|---|---|---|---|---|---|
| 8  | 25   |      | 25   |      | 4.9  | 0.86 | 70 | 9.0 |
| 9  | 15   | 15   | 15   |      | 5.02 | 0.89 | 60 | 8.6 |
| 10 | 20   | 20   | 10   |      | 6.9  |      | 73 | 3.5 |
| 11 | 30   | 15   | 5    |      | 6.2  |      | 76 | 5.0 |
| 12 | 32.5 |      | 17.5 |      | 5.7  |      | 77 | 8.5 |
| 13 | 20   |      | 20   | 10   | 5.5  |      | 93 | 2.4 |
| 14 | 25   |      | 12.5 | 12.5 | 5.0  |      | 91 | 4.8 |

[1] The diepoxide ether of polyoxypropylene glycol having an epoxide equivalent weight of about 330.
[2] D.E.R. 332, the diepoxide ether of bisphenol A having an epoxide equivalent weight of between 174 and 179.
[3] The triepoxide ether of the glycerol polypropylene glycol adduct having an epoxide equivalent weight of about 365.
[4] A higher molecular weight diepoxide ether of bisphenol A containing repeating ether groups and epoxide equivalent weight of about 538..

EXAMPLE 15

A resin composition of the invention was prepared by admixing 166.7 parts by weight of each of (1) the triepoxide ether, (2) the diepoxide ether and (3) D.E.R. 332 employed in Examples 1–4 above.

The viewing face of a 23 inch, 110° angle, television picture tube and a suitable protective face plate provided for it by the manufacturer were positioned in a spaced-apart relationship at a distance of 59 mils from each other. The assembly thus made was heated to 110° C. The resin composition prepared as described above was heated to 90° C. At this temperature, 70 parts of monoethanolamine, based on the weight of said composition, were admixed therewith. The settable composition which resulted was then promptly poured into the space between the protective face plate and viewing face of the television tube. After the space was filled with the resin composition, the assembly was allowed to stand undisturbed for a period of 5 minutes during which the composition gelled. As evidence of complete gelation, the assembly was inverted without any indication of fluidity of the resin composition. Thereafter the so protected assembled television tube containing the gelled composition of the invention was examined. The presence of the resin in no way interfered in service with the visibility of projected images. The assembly was alternately subjected to extreme temperatures of −30° C. and +70° C. for a period of several days at each temperature. No failure of the resin composition could be detected.

EXAMPLE 16

A resin composition of the invention was prepared by admixing (1) 206 parts by weight of the triepoxide ether, (2) 275 parts by weight of the diepoxide ether, and (3) 137.7 parts by weight of D.E.R. 332 employed in Example 15 above. A television picture tube and protective shield of the type described in Example 15, were positioned as there described and preheated to 110° C. The resin composition was heated to 61° C. At that temperature, 81 parts of monoethanolamine, based on the weight of said resin composition, were admixed therewith. Due to the exothermic nature of the reaction that ensued, the temperature rose to 70° C. At that temperature it was poured into the space between the viewing face and the protective plate of the television tube assembly. The composition gelled in about 4 minutes. No adverse effect on the viewability of the television tube due to the presence of the resin could be detected. The assembly was then tested as in Example 15 by alternating the exposure thereof to temperatures of −30° C. and +70° C. for several days at each temperature. No failure of the composition could be detected.

EXAMPLE 17

A television tube and protective face plate preassembly of the type prepared in Examples 15 and 16 above was made and heated to 110° C. A resin composition of the invention was prepared, consisting by weight of (1) 150 parts of the triepoxide ether, (2) 300 parts of the diepoxide ether, and (3) 50 parts of D.E.R. 331 employed in Examples 15 and 16. To the resin composition thus made were added 59.5 parts by weight thereof of monoethanolamine. The resulting curable composition was poured into the space between the viewing face and the protective plate of the television tube assembly. The resin gelled in about 20 minutes. The presence of the resin in no way appeared to affect the viewability of the picture tube. The entire assembly was tested as in Examples 15 and 16 by alternately subjecting it to temperatures of −30° C. and +70° C. No failure of the resin composition could be detected.

Examples 15–17 conclusively show the suitability of the resin of the invention for use in adhering protective plates to the viewing face of glass evacuated envelopes even though subjected repeatedly to extremes of heat and cold.

The invention, having been described, what is claimed and desired to be protected by Letters Patent is:

1. An epoxy resin composition adapted to being cured to a thermoset resin by subsequently admixing therewith a curing agent containing a functional group capable of effecting cross-linking of oxirane groups present in said resin composition consisting of (1) the triepoxide ether of a glycerol-polyoxyalkylene glycol adduct having an epoxide equivalent weight of between about 87 and about 1,000 in an amount by weight of between about 2 and about 50 percent of said composition, (2) a diepoxide ether of a polyoxyalkylene glycol having an epoxide equivalent weight of between about 84 and about 700 in an amount up to about 75 percent by weight of said composition and (3) a diepoxide ether of 4,4′-isopropylidenediphenol having an epoxide equivalent weight of between about 174 and about 1,000 in an amount up to about 60 percent by weight of said composition.

2. An elastomeric resin possessing high clarity and flexural properties consisting of the reaction product of claim 1 and a curing agent selected from the class consisting of primary amines, secondary amines, alkanol amines, polyglycol amines, polyalkylene amines, mixtures of said amines, dicarboxylic acids and anhydrides thereof, and Lewis acids.

3. A resin-laminated composite article consisting of a plurality of mating substantially parallel contoured sheets and a substantially uniform film of the composition of claim 1 between each adjacent pair of sheets, said film having a thickness of between 0.1 and 50 mils, adhesively bonded to said solid sheets.

4. The articles of claim 3 wherein the solid sheets are glass suitable for optical use.

5. In a television picture tube a protective shatterproof safety shield integrally secured to the outer surface of the viewing face thereof, consisting of a glass plate having the contour of said face and being maintained in a substantially uniformly spaced-apart position from said face by a continuous film of the elastomeric resin of claim 2.

6. An epoxy resin composition, adapted to being sub-

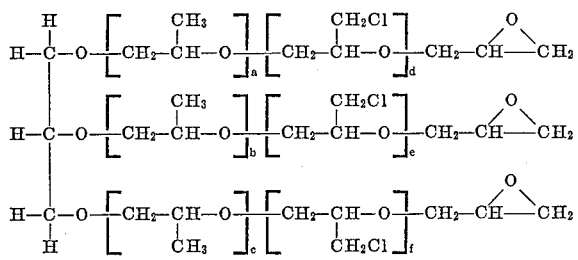

sequently made thermosetting by admixture therewith of a hardening agent that effects cross-linking among epoxide groups, consisting of (1) between about 2 and 50 percent by weight of a triepoxide ether having an epoxide equivalent weight of between about 87 and 1,000 and having the formula A:

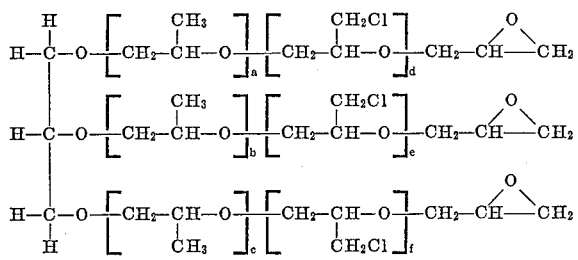

wherein $a$, $b$ and $c$ are independent values, the average sum thereof being about 3, and wherein $d$, $e$ and $f$ are independent values, the average sum thereof being less than 2 and (2) a sufficient amount, to make a total of 100 percent by weight, of a diepoxide ether selected from the class consisting of compounds having the Formulae (a) and (b):

(a) being

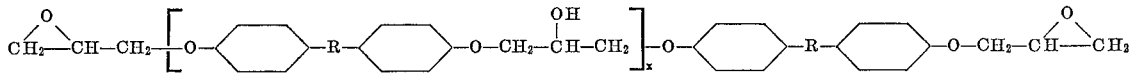

wherein R is an alkane residue containing from 3 carbon atoms and $x$ has a value of from 0 to about 10 to result in an epoxide equivalent weight of between about 174 and about 2,000, and (b) being

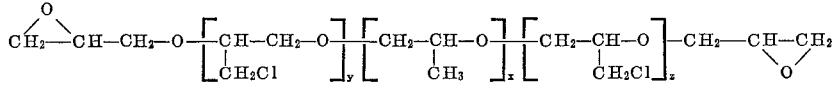

and mixtures of (1) and (2) where $y$ and $z$ have a value of from 0 to 1, and $x$ is of such value as to result in an epoxide equivalent weight of between about 84 and about 700.

References Cited by the Examiner

UNITED STATES PATENTS 2,293,529  8/1942  Bedford _____ 156—99
2,879,235  3/1959  Condo _____ 260—13
3,016,362  1/1962  Wismer _____ 260—830

OTHER REFERENCES

Lee and Neville, Epoxy Resins, McGraw-Hill, N,Y., 1957, TP 986 E614 (pp. 141–142 relied upon).

SAMUEL H. BLECH, *Primary Examiner.*

WILLIAM H. SHORT, MURRAY TILLMAN,
*Examiners.*